United States Patent

[11] 3,548,962

| [72] | Inventor | Harold E. Best |
| | | Rte. 3-Box 522, Apache Junction, Ariz. 85220 |
| [21] | Appl. No. | 783,039 |
| [22] | Filed | Dec. 11, 1968 |
| [45] | Patented | Dec. 22, 1970 |

[54] SINGLE TRACK CRAWLER VEHICLE
21 Claims, 21 Drawing Figs.

[52] U.S. Cl. .................................................. 180/9.44,
180/9.23; 305/44, 305/38
[51] Int. Cl. ........................................................ B62d 11/22
[50] Field of Search ........................................... 180/9.24,
9.44, 9.48, 5, 6.24; 305/40, 44, 41, 35, 38

[56] References Cited
UNITED STATES PATENTS

| 789,874 | 5/1905 | Owen .......................... | 180/9.44X |
| 1,069,159 | 8/1913 | Meier .......................... | 305/44X |
| 1,420,531 | 6/1922 | Dutkiewicz ................... | 305/44X |
| 2,061,290 | 11/1936 | Riemerschmid ............... | 180/9.24 |
| 2,455,307 | 11/1948 | Irvin ............................ | 305/44X |

FOREIGN PATENTS

| 710,824 | 8/1931 | France ........................ | 305/41 |

*Primary Examiner*—Richard J. Johnson
*Attorney*—Van Valkenburgh and Lowe

ABSTRACT: A single track crawler vehicle wherein the body of the vehicle includes depending skirt structures to hold transverse shafts having drive and idler wheels for supporting the crawler track. A suitable motor on the body is connected to the drive wheels. The track, extended about the wheels underneath the body of the vehicle, is formed as a continuous array of transversely disposed track bars interconnected by links at each side of the bars, a pair of links interconnecting two adjacent track bars. The connection of an end of a link to a bar is in a universally articulated manner to permit not only movement of the track about the wheels, but also a lateral shifting and angling of one track bar with respect to the other. The result is that the track path may be curved. The wheel arrangement supporting the track is further adapted to be turned by angling one set of wheels with respect to the other or with respect to the longitudinal axis of the body of the vehicle to initiate movement of the track along a curved path. Accordingly, the single track vehicle is capable of turning as well as moving along a straight course.

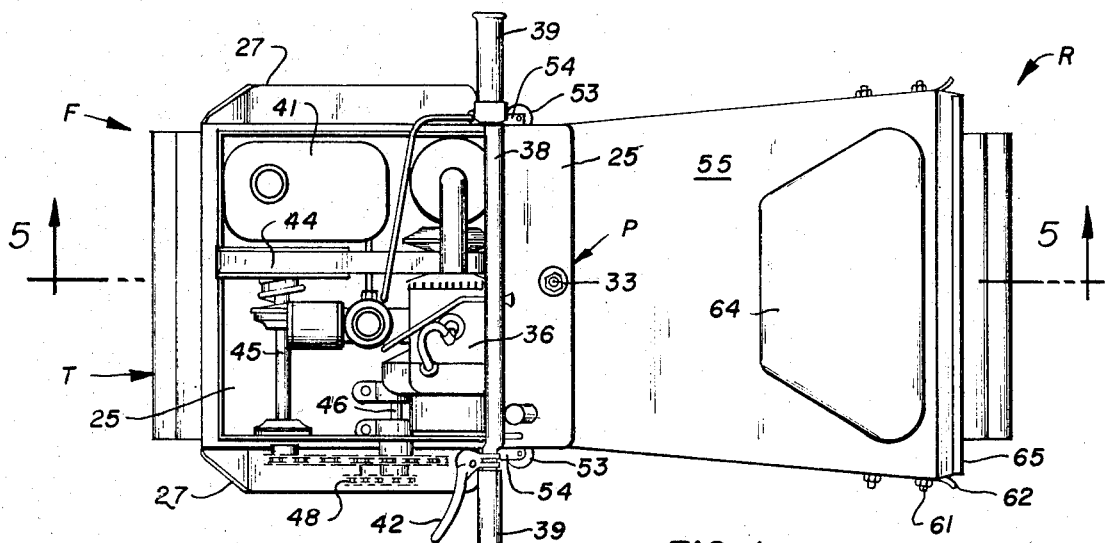
FIG. 1
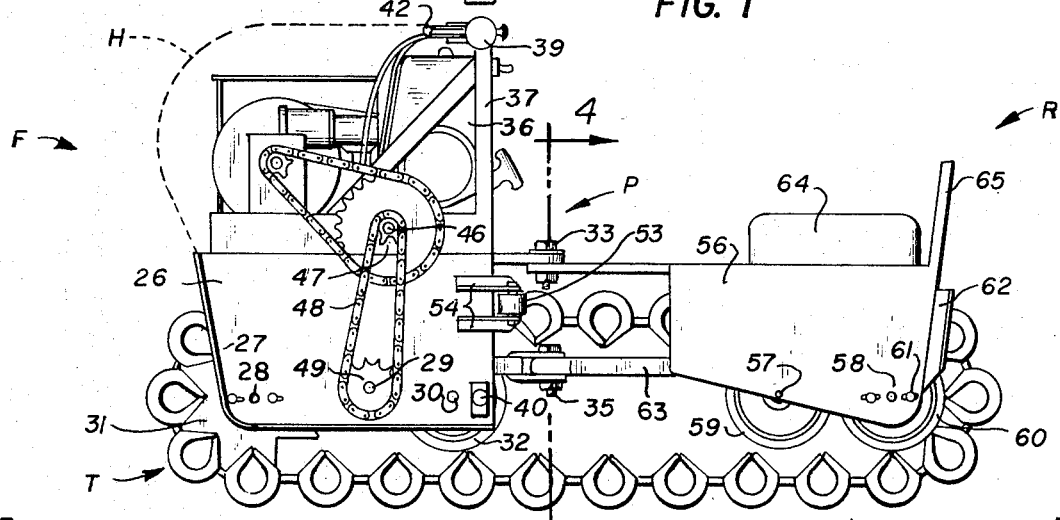
FIG. 2
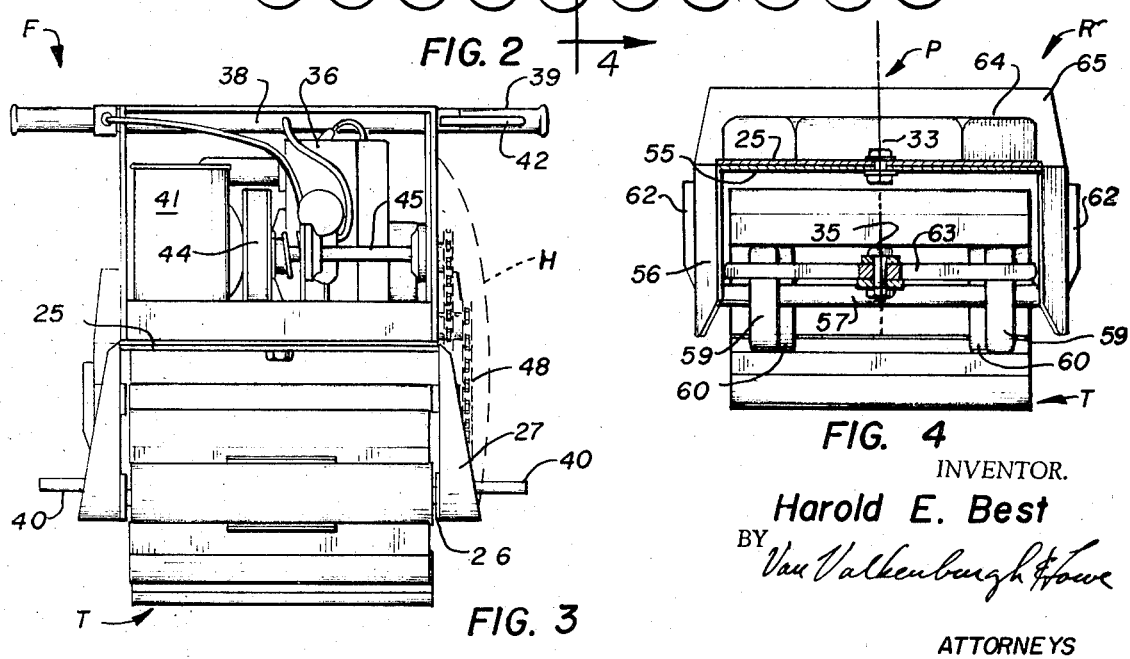
FIG. 3
FIG. 4
INVENTOR.
Harold E. Best
BY Van Valkenburgh Howe
ATTORNEYS INVENTOR.
Harold E. Best
BY
Van Valkenburgh & Lowe
ATTORNEYS INVENTOR.
Harold E. Best
BY
ATTORNEYS INVENTOR.
Harold E. Best
BY
Van Valkenburgh & Lowe
ATTORNEYS

SINGLE TRACK CRAWLER VEHICLE

This invention relates to crawler vehicles, that is vehicles mounted upon tracks, and the present invention concerns a vehicle mounted upon a single track. Accordingly, the invention will be hereinafter referred to and described as a single track crawler or as a single track crawler vehicle; however, it is to be recognized that a crawler vehicle can be built which uses two or even more of the track structures herein disclosed in a side-by-side arrangement.

A primary object of the invention is to provide a novel and improved single track crawler wherein the steering mechanisms and controls are directly associated with the crawler track to render unnecessary additional guiding devices such as steering wheels or skids at the front of the vehicle ordinarily used for controlling single track vehicles such as the popular snowmobiles.

Another object of the invention is to provide, in a crawler vehicle, a novel and improved track construction wherein the steering and turning of the vehicle is effected by articulation of the track structure.

Another object of the invention is to provide a novel and improved track construction for a crawler type vehicle which incorporates in its basic arrangement, a provision for angling the links and pads of the track with respect to each other as they are laid upon the ground while the vehicle is moving along a course, to thereby change the direction of movement of the vehicle.

A further object of the invention is to provide a novel and improved steerable track for a crawler type vehicle which permits the vehicle to be supported upon a single track the full width of the vehicle, thereby presenting a maximum possible contact surface upon the ground beneath the vehicle and a corresponding minimum unit pressure against any portion of the ground surface.

Another object of the invention is to provide a novel and improved crawler type vehicle having a single, wide track which can be easily driven over exceedingly rough terrain, and is especially capable of being driven over loose sand, mud, snow, marsh land and muskeg without bogging down.

Another object of the invention is to provide a novel and improved track, for a single track crawler, having a simple, rugged and reliable arrangement of components which produce a track capable of being articulated in a manner which effectively steers the vehicle.

Another object of the invention is to provide, in a single track crawler having a novel and improved steerable track, simplified control mechanisms associated with the track to facilitate the steering of the crawler as it is being operated.

Further objects of the invention are to provide, in a novel and improved steerable steerable crawler or track type vehicle having a single track, a construction which is compact, rugged, easily manufactured with conventional parts and is a low cost, neat appearing versatile unit.

With the foregoing and other objects in view, my present invention, as herein disclosed and defined in the appended claims, comprises certain constructions, combinations and arrangements of parts and elements as hereinafter described and illustrated in detail in preferred embodiments in the accompanying drawing in which:

FIG. 1 is a plan view of a single track crawler adapted for use as a one man vehicle, which exemplifies the principles of the invention.

FIG. 2 is a side elevation view of the unit shown at FIG. 1.

FIG. 3 is a front view of the unit shown at FIG. 1.

FIG. 4 is a transverse sectional elevation view as taken from the indicated line 4-4 at FIG. 2.

Figures 7, 8, 9, 10:
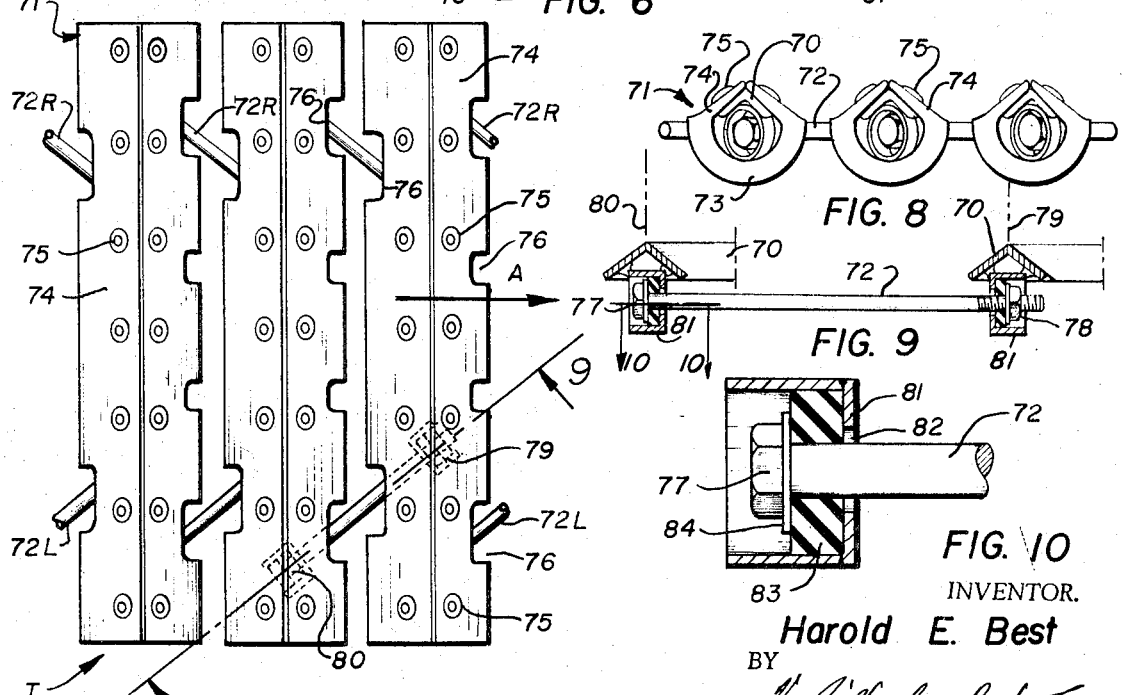
FIG. 7 is a plan view of a short section of the bottom reach of the track, as taken from the indicated arrow 7 at FIG. 5, but on an enlarged scale.
FIG. 8 is a side view of the track section shown at FIG. 7.
FIG. 9 is an oblique sectional view of a portion of the track as taken from the indicated line 9-9 at FIG. 7, but with the wear pads being removed to show the manner in which the track bars are interconnected by a link.
FIG. 10 is a fragmentary sectional detail, as taken from the indicated line 10-10 at FIG. 9, but on a further enlarged scale.
Figures 12, 13:
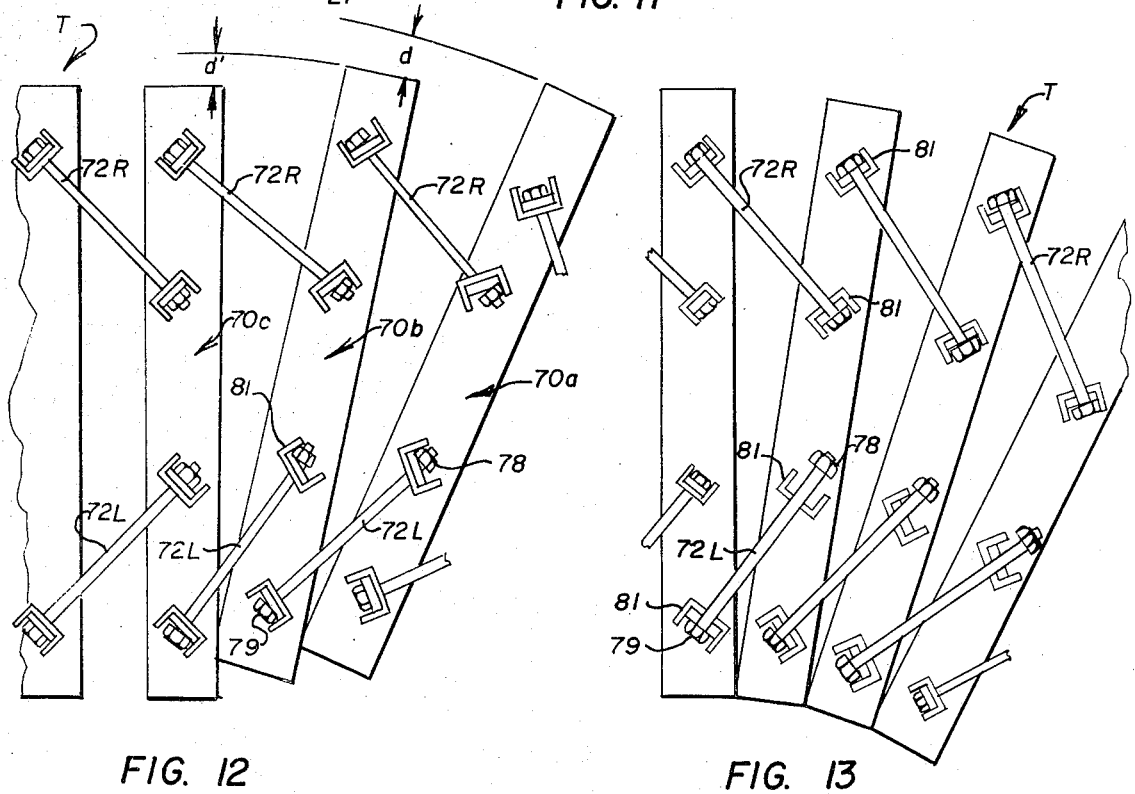

FIG. 12 is a diagrammatic, somewhat exaggerated phantom view of a short portion of the bottom reach of the track similar to the reach shown at FIG. 7, but illustrating the manner in which the tracks are angled and shifted with respect to each other when swinging about the inner and outer link connections to the track bars, the view depicting one manner in which the track may be shifted to form a curved path as when the crawler is turning.

FIG. 13 is a diagrammatic phantom view, similar to FIG. 12, but with the tracks being angled in a different manner as by swinging about the outward link connections to the track bars and as by a sliding of the inner set of links in their connections, the view depicting another manner in which the track may be shifted to form a curved path as when the crawler is turning.

Figure 14:
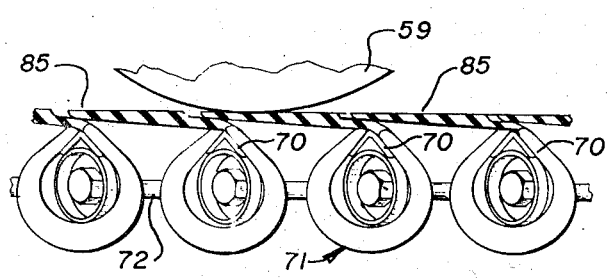

FIG. 14 is a side view of a section of a track, similar to FIG. 8, but showing overlays between each track section whereagainst load-supporting idler wheels may bear to produce a smoother riding action.

Figure 15:
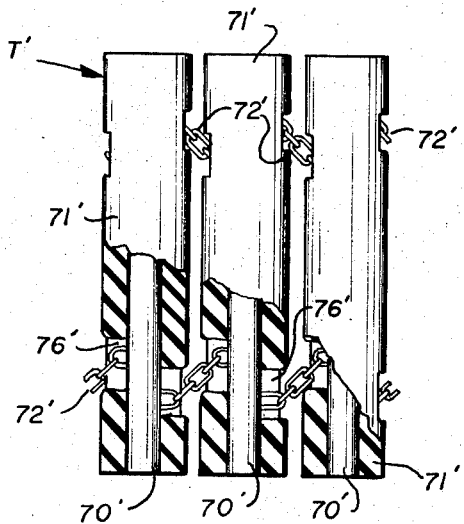

FIG. 15 is a plan view of a short section of a bottom reach of a track, similar to the showing at FIG. 7, but on a somewhat reduced scale and illustrating a modified construction thereof.

Figure 16:
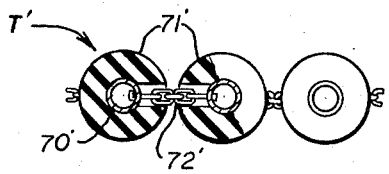

FIG. 16 is a side view of the track section shown at FIG. 15, but with portions being broken away to show constructions otherwise hidden from view.

Figure 17:
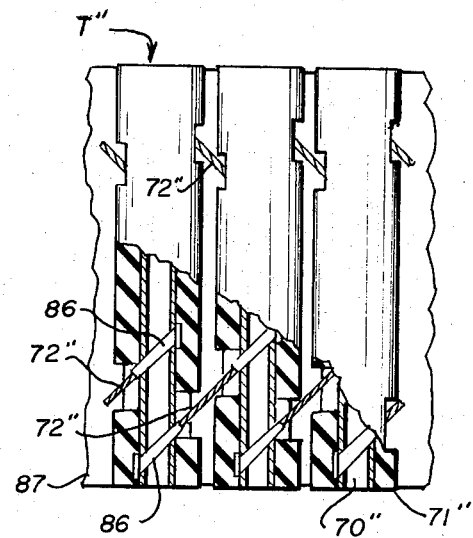

FIG. 17 is a plan view of a short section of a bottom reach of a track, similar to FIG. 15, but illustrating another modified construction thereof.

Figure 18:
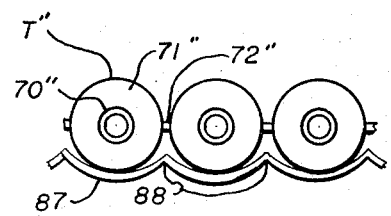

FIG. 18 is a side view of yet another track section, similar to FIG. 16, but including a continuous web at the underside of the track members.

Figure 19:
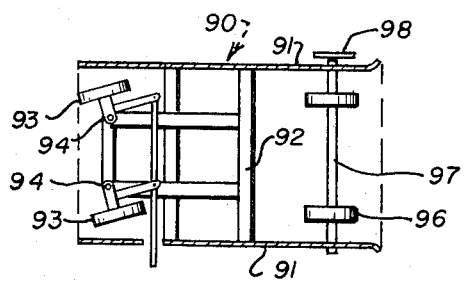

FIG. 19 is a diagrammatic plan view, on a reduced scale, of an alternate carriage mounting structure and steering control for holding and steering the improved track in accordance with the principles of the invention.

Figure 20:
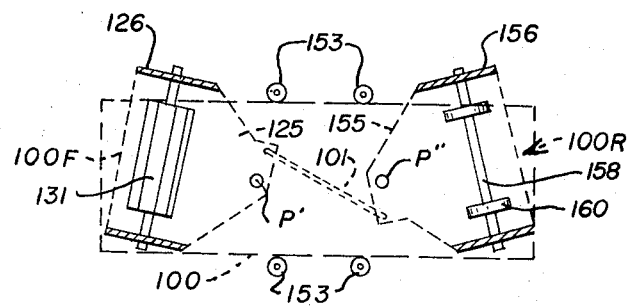

FIG. 20 is a diagrammatic plan view similar to FIG. 19, but showing another alternate carriage mounting structure and steering control mount for holding and steering the improved track in accordance with the principles of the invention.

Figure 21:
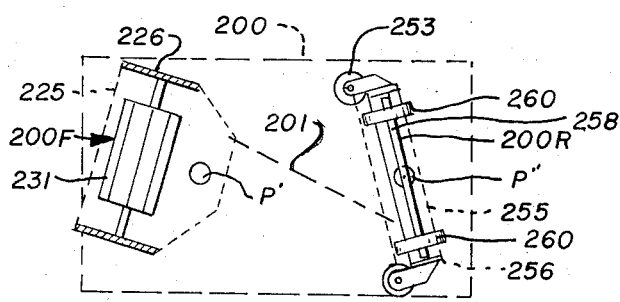

FIG. 21 is a diagrammatic plan view similar to FIG. 19, but showing a further variation of an alternate carriage mounting structure and steering control mount.

Referring more particularly to the drawing, the single passenger, single track crawler illustrated at FIGS. 1 to 11 is suitable for use as a sporting vehicle and as a unit capable of conveying a man over marshy or sandy terrain where walking would be extremely difficult. This unit is representative of one embodiment of the invention and the size of the machine could be easily increased to provide space for several passengers and for cargo. The body of the crawler is formed as two interconnected sections, a front section F and a rear section R. A continuous, flexible crawler track T is mounted upon wheels and sprockets at the undercarriages of both of these sections, to extend longitudinally about the undercarriages and form a lower driving reach of track supporting the crawler which normally moves from the front to the rear of the crawler, and an upper return reach of track extending through the undercarriage which normally moves from the rear to the front of the crawler. The two sections are interconnected at the center of the body, as at a normally vertical pivot axis P so that one section may swing in a horizontal plane with respect to the other. This swinging effects steering of the unit for the flexible track will curve with the swinging movements of the body section, as will be hereinafter further described.

Figure 5:
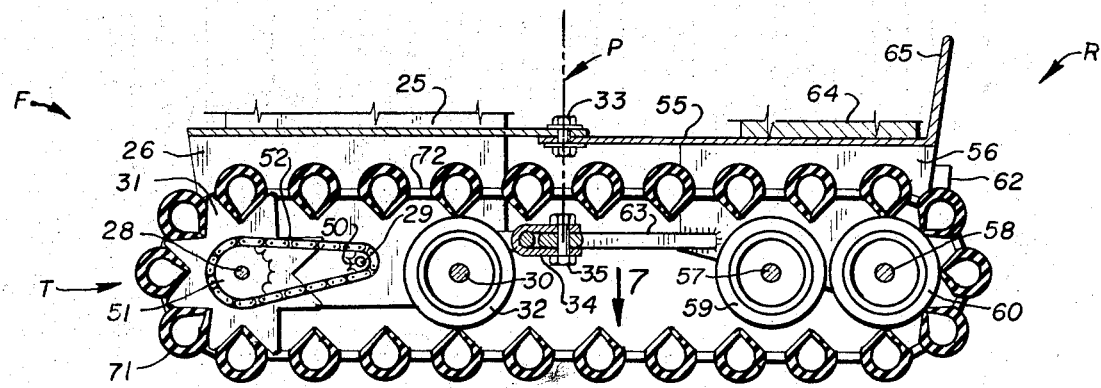
FIG. 5 is a longitudinal sectional elevation view, as taken substantially from the indicated line 5-5 at FIG. 1.
Figure 6:
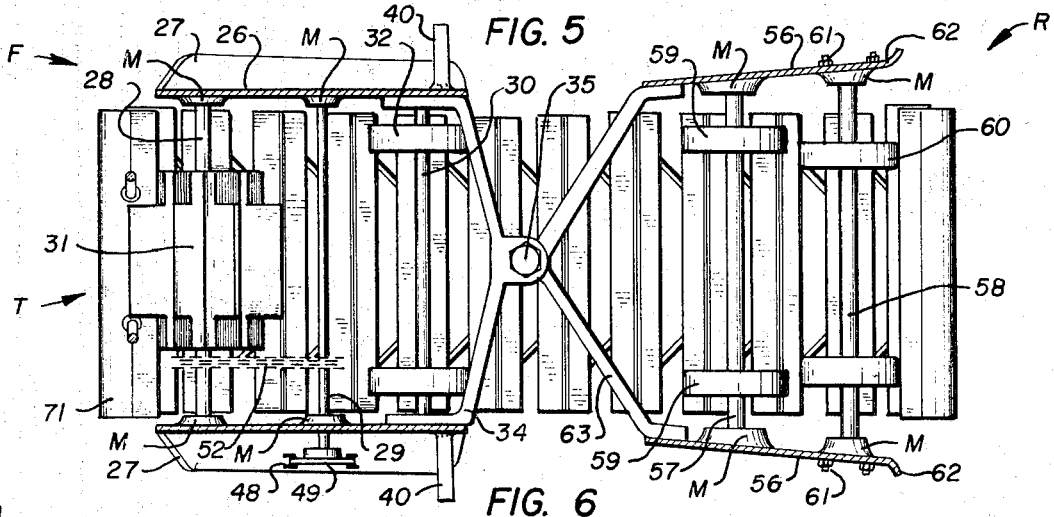
FIG. 6 is a sectional plan view of the track-supporting undercarriage beneath the upper reach of the track.

The basic structure of each section consists of a flat deck with skirts depending from each side of the deck to support the undercarriage structure. Each section thus may be conveniently formed as a flat metal member folded to the general shape of an inverted U. The front section deck 25 is rectangular in form with side skirts 26 depending from its side edges a distance sufficient to carry bearing mounts M for its undercarriage as shown at FIG. 6. An outwardly flared, shelflike flange 27 at the front and bottom edges of each skirt 26 protectively reinforce the structure. This undercarriage includes a transverse drive shaft 28 at the front of the section, an intermediate jack shaft 29 and an idler shaft 30 near the rear of the section as best shown at FIG. 5. These shafts lie in a common pane between the upper and lower reaches of the track T and the drive shaft 28 carries a track sprocket 31 for driving and supporting the track. The jack shaft is operatively connected to the drive shaft as will be described. The idler shaft 30 carries idler wheels 32 which lie between the support both the lower and upper reaches of the track.

A portion of the deck 25 extends rearwardly of the skirts to carry a central pivot bolt 33 which connects with the rear section R. To supplement this connection below the deck level, a rearwardly extended transverse yoke 34 spans the skirts between the upper and lower reaches of the track, as best illustrated at FIGS. 5 and 6. A lower pivot bolt 35 is carried at the central extension of this yoke at a location directly beneath and axially aligned with the pivot bolt 33. The two pivot bolts 33 and 35 connect with the rear section R to define the pivot axis P and form a rigid coupling between the front and rear members capable of permitting these members to swing laterally with respect to each other and in a normally horizontal plane, as hereinafter further described.

A motor 36 and the drive mechanism are mounted upon this front deck in a rectangular, boxlike frame 37 upon the deck. The rearward portion of this frame upstands from the deck to carry a transversely disposed rod 38 which extends from each end of the frame as control handles 39. In operation, these control handles are supplemented by foot rests 40 at the base of the skirts. A fuel tank 41 is provided within the framework and suitable motor controls are appropriately located on the frame 37 and a throttle lever 42 is located on one of the handles 39.

The driving mechanism carried upon the frame 37 includes a variable speed clutch 43 at the motor and a speed reducing belt, chain and sprocket train 44 is mounted upon shafts 45 and 56 which are carried in suitable bearings upon the frame to terminate as a driver sprocket 47 on the shaft 46 at one side of the section. Thence, a chain 48 extends downwardly to a sprocket 49 on the jack shaft 29. A sprocket 50 is positioned on the jack shaft 29 between the skirts 26 at one side of the track sprocket 30. This sprocket 50 connects with a sprocket 51 on the drive shaft 28, as by a chain 52, to complete the drive mechanism and to reduce the speed of rotation of the drive shaft to a desired value for driving the track sprocket 30 and the track T moving about the sprocket 30. The motor, the sprocket train 44 and the chain 48 and sprockets 47 and 49 are enclosed in a suitable hood H, as outlined in broken lines at FIGS. 2 and 3.

Figure 11:
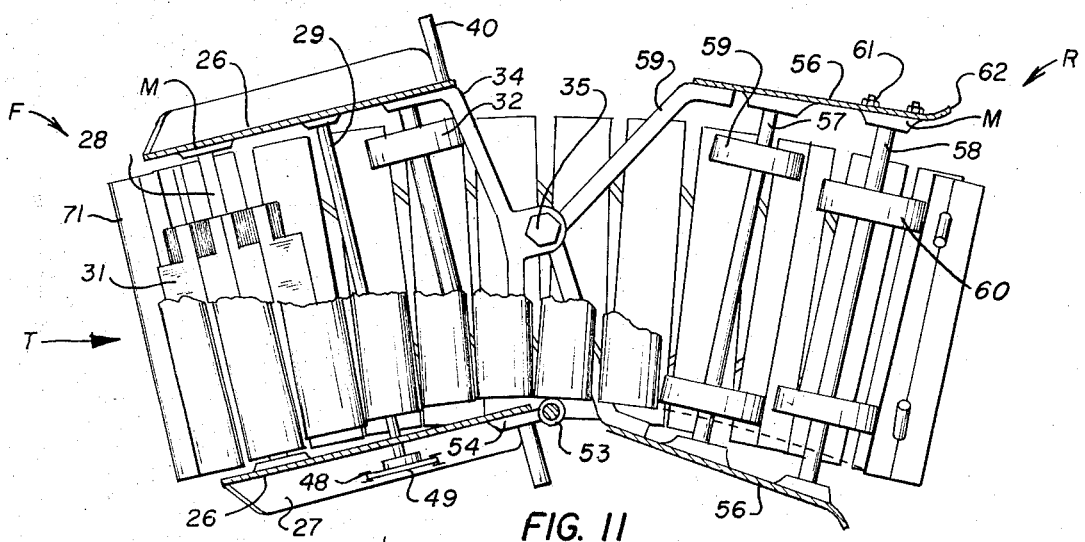
FIG. 11 is a sectional plan view similar to the showing at FIG. 6, but with the crawler shifted for a left turn, the view illustrating also, a fragment of the upper reach of the track to show the manner in which this reach is held while the crawler is turning.

To complete this section, a sidewheel 53 is mounted upon suitable brackets 54 at the rear edge of each skirt and alongside the upper reach of the track T to contact that reach of the track when the unit is turning as illustrated at FIG. 11.

The rear section R is formed as a flat deck 55 similar in construction to the front deck 25. Side skirts 56 depend from the side edges of this deck to carry bearing mounts M for a transverse intermediate idler shaft 57 and a rear idler shaft 58. These shafts lie between the upper and lower reaches of the track T to carry a pair of intermediate idler wheels 59 and rear idler wheels 60, respectively, as will be described. The mounts M for the rear idler shaft 58 are provided with suitable longitudinal adjustment bolts on the side skirts 56, as indicated at 61, to permit this shaft 58 to be shifted to tighten or loosen the track as needed.

The side skirts 56 diverge rearwardly at a small angle to increase the rearward width of the unit and thus provide clearance for lateral movements of the rear end of the track as it shifts when the crawler is commencing or completing a turn, and the rear edge of each skirt is flared outwardly as a smooth belled edge 62 so that should the return reach of the track strike a side skirt, as when the crawler is commencing or completing a sharp turn, the track will be deflected against a smooth, curved surface.

A portion of the deck 55 extends forwardly of the side skirts 56 to underlie the rearward portion of the front deck 25 and to be connected thereto by the pivot bolt 33. To supplement this connection, a forwardly extended transverse yoke 63 spans the skirts between the upper and lower reaches of the track, and the yoke includes a central forward extension to connect with the pivot bolt 35 on the extension of the front yoke 34, as heretofore described.

The rear section R is adapted to carry a passenger in the crawler depicted and a suitable seat 64 is mounted upon the deck 50. A back rest 65 is provided at the rear end of the deck to complete the section. However, as heretofore indicated, this arrangement of seating upon the deck can be varied considerably.

The track T is a continuous loop of closely spaced, transverse bars 70 which are embraced by tubular, resilient pads 71 and articulately interconnected by spaced pairs of links 72. The organization of these components is best illustrated at FIG. 8, the pads 71 and links 72 only being shown at FIGS. 2 and 5 because of the small scale of the drawing. The lower reach of the track extends from the front drive sprocket 31 to the rear of the crawler to turn about the rear wheels 60 and extend thence as the upper reach, forwardly to the front sprocket to complete the loop. The intermediate idler wheels 32 on the front section and 59 on the rear section are preferably, at least the same diameter as the rear wheels 60 and all are preferably of a diameter which is correlated with the base size of the sprocket 30 so that these idler wheels support both the lower and upper reaches of the track, as illustrated at FIG. 5. The teeth of the drive sprocket are shaped to fit the padded bars 70 as they are wrapped about it at the front end of the crawler, and in the construction illustrated, these teeth form the general shape of an eight pointed star. It is to be noted, however, that this tooth shape will vary from one sprocket to the next to fit different track bar forms such as hereinafter described.

In the track construction illustrated at FIGS. 7—10, each bar 70 is formed as a conventional structural angle having its crotch facing outwardly of the track and downwardly at the lower each. The pad 71 is formed as a fiber-reinforced rubber strip similar to a common tire structure with a comparatively thick and heavy center portion 73 which forms the outward wearing surface of the track and thinner side portions 74 which are folded about the angle bar 70 and secured thereto by rivets 75 to provide the desirable tubular form as illustrated at FIG. 8. Openings 76 in the sides of the pads are provided to fit the links 72 in position when interconnecting the components to form the track.

Each bar 70 is connected to its adjacent bar, at either side, by a pair of spaced-apart links 72R and 72L which are, in the construction illustrated at FIGS. 7—10, rigid bolts having a head 77 at one end and a nut 78 at the other end. Each link is inclined with respect to the longitudinal alignment of the track at an angle which may vary from 30 to 60° but which is preferably approximately 45°. Accordingly, one end of a link 72R at one side of the track will connect with one bar 70 at a point 79 which is center to the center of the bar and the other end of the link will connect with the adjacent bar 70 at a point 80 which is nearer to the outer end of the bar, as in the manner exemplified at FIGS. 7 and 9. The opposite link 72L of the pair is likewise arranged in symmetrical opposition to the link 72R, with all of the links of each set being arranged in the same manner along the respective sides of the track to present a symmetrical herringbone pattern of links 72R and 72L as clearly illustrated at FIGS. 6 and 7. It is important to orient the links forming this herringbone pattern with the inwardly positioned closer ends of each link pair, i.e., the end defined by the point 79, leading the outwardly positioned opposite ends of the pair, i.e., the end defining the point 80, with respect to the direction of forward movement of the track T when it is passing over the front drive wheel indicated by the arrow A at FIG. 7.

The connection of each end of a link 72 to its bar 70 is effected by providing a cuplike retainer 81 which is welded into the crotch of the angle bar at an inclination with respect to the bar 70 which corresponds to the normal alignment of the link. The retainer is formed with a hole 82 through its base, through which the shank of the bolt-type link 72 will loosely fit. A tough, rubber washer 83 is fitted into the bottom of this retainer which is sized to tightly fit in the retainer. The link shank extends through this washer to snugly fit therein. This rubber washer 83 is protected with a rigid metal washer 84 and either the bolt head 77 or the nut 78 fits within this cup retainer to ordinarily bear against the washer 84 as illustrated at FIG. 10, to provide a tight fit, but a fit which will permit articulation of the link at the connection. By adjusting the nut 78 upon the link bolt, the track may be tightened or loosened and its length adjusted. Accordingly, this nut 78 is preferably a friction lock type which permits adjustments but will not turn or slip responsive to movements and vibrations of the track.

The turning of the crawler is effected by an operator swinging the front section F about the pivot axis P in the direction of the desired turn, by pulling against the handles 39 and pushing against the foot rests 40. This swing cause the track bars 70 to be angled and offset with respect to each other as they are moved from the drive socket 31 and to the lower reach on the ground surface, as in the manner illustrated at FIGS. 11, 12 and 13. FIG. 11 shows generally, the manner in which the track flexes when it is in a turn. FIGS. 12 and 13 which are exaggerated and diagrammatic, show two basic different types of track movement which may occur when the tack bars are being flexed about a curve. It is to be noted that with either type of movement, the retainers 81 must permit the rigid links to flex as if they were ball and socket joints, and this is possible because of the resilience of the washers 83 and the oversize holes 82 through which the link shanks extend. The links will flex in one manner when the crawler is moving along a straight path with the padded track bars 70 moving about the sprocket 30 and about the end wheels 60, but otherwise remaining in straight alignment. They will flex in a more complex manner and in various directions when the bars are being shifted laterally and angularly to permit the crawler to turn.

In the flexure pattern illustrated at FIG. 12, the track bars are shifted angularly and are also offset laterally with the links 72R and 72L being pivoted at each end within their retainers 81. This action produces a curved pattern which, when extended, produces a spiral or involute. When the track bars move around the sprocket 47, or about steering wheels at the front of the crawler, and are positioned upon the ground in this curved and offsetting manner, each bar becomes angled with respect to the other, and also shifted laterally from a true radial position as indicated by the spaces d and d'. It is to be noted that when the inwardly positioned link ends of the herringbone pattern of links is leading the outwardly positioned link ends, as heretofore described as being the desirable arrangement, the lateral movement of the track bars will be into the turn to supplement and assist the turning action. This action is apparent by considering the movement sequence of track bars 70A, 70B and 70C at FIG. 12. First, the track bar 70A will be passed about the sprocket and laid upon the ground. It is followed by the track bar 70B which is angled, and also shifted in the direction of the turn, the lateral distance d. Next the bar 70C is angled and also shifted a lateral distance d in the direction of the turn. To demonstrate that this shifting movement in the direction of the turn is advantageous, the track was reversed so the direction of the herringbone pattern of links 72 was with the outwardly positioned ends of each pair of links leading the inwardly positioned ends and in a turn the shift occurred in an opposite manner with the lateral movement links being away from the turn. This caused considerable difficulty in steering the crawler and in some units caused the track bars to shift sidewise to jam against the crawler frame.

When a crawler is negotiating a turn at a substantial rate of speed, the offsetting pattern of the track bars, as indicated at FIG. 12 will occur only to a limited degree, as at the start and finish of the turn. Instead, the track bars will assume more nearly a circular or radial pattern as illustrated at FIG. 13. When the track curves thus, the outward links 72L are held tightly in their retainers 81. However, the inward links cannot follow a similar pattern because they are comparatively, too long and one end of the other of each link will slip from its retainer as illustrated at FIG. 13. In actual operation of a crawler, both actions of the track, as illustrated at FIGS. 12 and 13, occur and a precise description of the actual action of the track members with respect to each other is not possible. However, observations of the crawler when it is turning clearly indicate that the inner links, with respect to the curve, will be relieved of all tension even though they may not be pushed completely out of their sockets. On the other hand, the outward links are tightly held in their retainers.

In turning a curve in either manner, it is noted that the upper reach of the track, striking the sidewheel 53 is also held in a similar arcuate pattern so that the track bars move to the leading sprocket in a proper transverse position with respect to the sprocket. Moreover, they will leave the rear wheels 60 as they enter the upper reach of track in a similar transverse position, with respect to the rear wheels, and are substantially parallel with the axis of the rear wheel shaft 58.

As best illustrated at FIG. 5, the intermediate idler wheels which support the upper and lower reaches of the track are not always contacting the track. In that figure, the wheel 32 on the front section F is illustrated at contacting track members both above and below the wheel. On the other hand, the wheel 59 on the rear section R is illustrated as being between track members. This produces intermittent contacts which can cause vibration and a rough ride for a passenger. This intermittent contact is substantially eliminated by the use of tabs 85, shown at FIG. 14, at the inner side of the track sections which may extend from one edge member 74 of the track pad and over the track bar with the end lying upon the adjacent track bar. The tabs 85 are necessarily formed as a row at each side of the track to clear the sprocket 30 at the center of the track and the position at the idler wheels will be such as to rest upon the pass.

Various modifications of the track and the crawler structure are possible, as are indicated at FIGS. 15 to 21. Such modifications will include variations of track structure and variations of the undercarriage of the crawler. The track T' shown at FIGS. 15 and 16, is held together by links 72' formed as short lengths of chain. The track bars 70' are cylindrical or tubular members having a tubular pad 71' surrounding each bar 70' with openings 76' in these pads at suitable spacings for connection of the links 72' with the track bars 70' These links are angled in the same manner as the rigid links heretofore described to form a herringbone pattern and although they are not rigid members, they function in precisely the same manner as does the link structure illustrated at FIGS. 7 to 10. When entering a curve, the outward links are held tautly and the inner links either shift the track bars into the turn or collapse somewhat to be shortened as the inner portions of the tack bars move together. It is to be noted that with this arrangement of tubular track pads, the sprocket provided for driving the apparatus will be formed differently from the sprocket 30 heretofore described in that the sockets between the teeth of the sprocket will be circular to accommodate the track pads. The links 72' of chain portions may be encased in a protective rubber shield or tube to minimize their wear, as in any suitable manner, not shown.

The track T″ illustrated at FIGS. 17 and 18, is similar to the track T′ illustrated at FIGS. 15 and 16, excepting that the links 72″ are formed as short stretches of wire rope the ends of which are secured in ferrules 86 extending through the walls of the tubular track bars 70″. Also, this track T″ is shown as being provided with an undersheeting 87, of a fabric reinforced rubber sheet or similar material, formed generally as an accordion-folded member, having alternate fold portions vulcanized or otherwise affixed to the track pads 71″, as is illustrated at FIG. 18. The accordion fold, with a ridge 88 of fabric between each track bar permits the adjacent track bars to flex and shift as the crawler is turning as heretofore described.

The improved single track crawler can be modified by using different body arrangements, especially where larger units are needed and it is not desirable to steer the unit by swinging an entire section of the body, such as the front section F.

In the unit diagrammatically illustrated at FIG. 19, a single body 90 structure, not shown in detail, is provided with side skirts 91 adapted to carry the undercarriage of the crawler. This undercarriage includes a framework 92 between the upper and lower reaches of track which carries front steering wheels 93 mounted upon king pin supports 94 and controlled by a steering bar 95 extending to the side of the body and upwardly to a suitable control on the deck of the body. This crawler unit will include rear drive wheels 96 mounted upon a drive shaft 97 which is powered by a suitable drive mechanism at one side of the body as indicated at 98. A track is extended about the front steering wheels 93 and rear drive wheels 96 which is of the same construction as one of the tracks T, T′ or T″ heretofore described. It was found that with this arrangement a friction type drive of the rear wheels upon the track bars was preferable to using a sprocket for often the track bars 30 did not roll upon the rear drive wheels in a position parallel to the axis of the wheels.

The unit illustrated diagrammatically at FIG. 20 is similar in many respects to the unit shown at FIGS. 1 to 10, however, it depicts a crawler having a single rigid body 100, a front steering section 100F and a comparable rear steering section 100R. Each section is formed with a deck structure 125 and 155, respectively, having respective side skirts 126 and 156; the front carrying a drive sprocket 131 and the rear carrying idler wheels 160. Each section is mounted to the body by spaced apart pivots P′ and P″ which are offset from the shafts of the respective sprockets 131 and wheels 160. Any suitable drive mechanism may be used to drive the sprocket 131 and any suitable steering control, not shown, may be used to swing each section. Preferably, the sections are interconnected by a diagonally disposed cross bar 101 or similar linkage, to force them to swing together as illustrated. Side wheels 153 are provided at each side of the unit to hold the upper reach of the track in position as it makes a turn. Any suitable array of intermediate idler wheels, not shown, may be used to support the lower and upper reaches of track between the front drive sprocket and rear idler wheels.

The unit illustrated at FIG. 21 is similar to the unit ilustrated at FIG. 20. The body 200 carries a front section 200F and a rear section 200R. Each section is formed with a deck structure 225 and 255 respectively, having respective side skirts 226 and 256. The front section carries a drive sprocket 231 and the rear section carries wheels 260 on a shaft 258. The front section is mounted to the body by a pivot P′, the same as heretofore described; however, the rear section is mounted to the body by a pivot P″ which is directly above the shaft 258. In this arrangement the side wheels 253, holding the upper reach of track, are connected to the rear section at the forward edge of the skirt 256 as illustrated, and these side wheels 253 hold the track in position on the rear wheels 260 while the centered pivot P″ permits the rear end of the track to swing to a natural position while the front section is controlling the steering action.

I have now described my invention and modifications thereof in considerable detail and it is apparent that yet other modifications and alternate arrangements which are also within the scope of the invention are possible.

I claim:
1. A single track crawler vehicle comprising:
   a. a body structure having a deck and undercarriage members depending from opposite sides of the deck;
   b. a transversely axised track supporting wheel means between the undercarriage members and beneath the deck including a front wheel means at the front end of the vehicle and a rear wheel means at the rear end of the vehicle;
   c. a steering means associated with the front wheel means;
   d. a drive means associated with the wheel means; and,
   e. a continuous crawler track extending about the wheel means in a normally longitudinal alignment, said crawler track comprising:
   transversely disposed track bars and a longitudinally disposed row of links adjacent to each side of the track holding the bars together with each link interconnecting adjacent bars;
   wherein the connections of each link to an adjacent bar is flexible to permit one bar to be shifted and rotated in the aforesaid normal longitudinal alignment with respect to the other adjacent bar as when the track turns about the wheel means and to also permit one bar to be angled and to be shifted laterally with respect to the other adjacent bar; and
   wherein said steering means is adapted to normally hold the track in its normal longitudinal alignment, but to so angle and to shift the track bars laterally to flex the track to a curved pattern and thereby affect turning the vehicle as it moves.

2. In the organization set forth in claim 1, wherein said front wheel means is a pair of wheels and said steering means is adapted to turn the wheels to the right or left to effect steering of the track.

3. In the organization set forth in claim 1 including restraining means at each side of the vehicle body adapted to restrain the center portion of the track as said steering means shifts the track to a curved pattern.

4. In the organization set forth in claim 1, wherein said steering means includes a carriage structure adapted to support the front wheel means and a similar carriage structure adapted to support the rear wheel means, each carriage structure being pivotally connected to the body to swing about a vertical axis and means adapted to simultaneously swing the front carriage and the rear carriage in opposition.

5. In the crawler vehicle defined in claim 1, wherein each link is angled with respect to the longitudinal axis of the track with the row of links adjacent to one side of the track being angled in one direction and the row of links at the opposite side of the track being angled in the opposite direction to arrange the link rows in a balanced, herringbone pattern.

6. In the organization defined in claim 5, wherein the connection points to a track bar, of the two links between any two adjacent bars, which lie closer to the center of the track, lead the connection points to the other bar which lie further from the center of the track, in the direction of the track movement about the aforesaid wheel means during the normal forward movement of the vehicle.

7. In the organization set forth in claim 5, wherein each link is a rigid member having ahead at each end; a cuplike socket through which the link slidably extends is affixed to each bar to normally hold a head of the link in the socket, and a resilient washer at the base of each socket holds the head to minimize the shock of pulling the head against the socket.

8. In the organization set forth in claim 1, wherein each link connection between adjacent track bars is collapsible to permit the bars to move together.

9. In the organization set forth in claim 8, wherein each link is a flexible cable.

10. In the organization set forth in claim 8, wherein each link is a rigid member and a socketlike connection member is carried on a track bar at an end of the link, to hold the link and to permit the link to swing within and slide through the connection member.

11. In the organization set forth in claim 1, wherein said front wheel means is affixed to a normally transverse, horizontal shaft and said steering means is adapted to swing said shaft about a vertical axis.

12. In the organization set forth in claim 11, wherein said body structure is articulated to swing about a vertical axis with the forward portion of the body structure carrying the aforesaid steering means.

13. In the organization set forth in claim 12, wherein said front wheel means is formed as a cog about which the track rotates and said drive means is adapted to rotate the same to move the vehicle.

14. In a track for a crawler vehicle having an array of transversely disposed track bars and a longitudinally disposed row of links adjacent to each side of the track and holding the bars together with each link interconnecting a pair of adjacent bars, the improvement wherein:

each link is flexibly connected to the bars to permit one bar to be shifted and rotated with respect to the other and to permit lateral shifting movements of one track bar with respect to the other to flex the track in a curved pattern as it moves along a path; and wherein each link is angled with respect to the longitudinal axis of the track with the row of links adjacent to one side of the track being angled in one direction and the row of links at the opposite side of the track being angled in the opposite direction to arrange the link rows in a herringbone pattern.

15. In the track defined in claim 14, wherein each link is a short length of chain.

16. In the organization set forth in claim 14, wherein each link is a rigid member and socketlike connection members are carried on the track bars connecting with each end of each link to hold the link and to permit it to swing within and to slide through the connection member.

17. In the organization set forth in claim 14, wherein each track bar is enveloped in a resilient pad.

18. In the organization set forth in claim 14, wherein each track bar is covered with a resilient pad and tabs at the inner face of the track overlying the spaces between the bars in a continuous array provide a surface for receiving supporting wheels which hold the track in position when in use.

19. In the track defined in claim 14, wherein the links are angled with respect to the longitudinal axis of the track between 30° and 60° F.

20. In the track defined in claim 14, wherein the links are of flexible cable.

21. In the track defined in claim 14, wherein each link is a rigid, boltlike member having a head at each end; a cuplike socket through which the link extends is affixed to each bar at each link connection to hold the head at an end of a link, permit the same to swing in all directions and permit the link to slide through the socket as when the track bars move together.